(12) United States Patent
Gourlay

(10) Patent No.: US 8,419,986 B2
(45) Date of Patent: Apr. 16, 2013

(54) METHOD OF PRODUCING A COMPOSITE LIGHT GUIDING DEVICE

(75) Inventor: James Gourlay, Dumbarton (GB)

(73) Assignee: Design LED Products Limited, Livingston (GB)

( * ) Notice: Subject to any disclaimer, the term of this patent is extended or adjusted under 35 U.S.C. 154(b) by 0 days.

(21) Appl. No.: 13/096,234

(22) Filed: Apr. 28, 2011

(65) Prior Publication Data
US 2011/0198026 A1    Aug. 18, 2011

Related U.S. Application Data

(62) Division of application No. 12/096,495, filed as application No. PCT/GB2007/001967 on May 25, 2007, now Pat. No. 7,954,990.

(30) Foreign Application Priority Data

May 26, 2006  (GB) .................................. 0610441.8
Aug. 24, 2006  (GB) .................................. 0616755.5

(51) Int. Cl.
*B29D 11/00*    (2006.01)

(52) U.S. Cl.
USPC ......... 264/1.24; 264/1.7; 264/132; 427/163.2

(58) Field of Classification Search ................. 264/1.24, 264/1.27, 1.36, 1.7, 1.38, 132; 427/163.2; 362/615, 629
See application file for complete search history.

(56) References Cited

U.S. PATENT DOCUMENTS

| 5,502,623 | A | 3/1996 | Brotz |
| 5,743,616 | A | 4/1998 | Giuliano et al. |
| 5,947,578 | A | 9/1999 | Ayres |
| 7,360,938 | B2 | 4/2008 | Mizuyoshi |
| 7,490,971 | B2 | 2/2009 | Iwasaki |
| 2002/0142096 | A1* | 10/2002 | Connell et al. ................ 427/271 |
| 2004/0066659 | A1 | 4/2004 | Mezei et al. |
| 2004/0109629 | A1* | 6/2004 | Kondo ............................. 385/14 |
| 2004/0136639 | A1 | 7/2004 | Kondo |
| 2004/0136715 | A1 | 7/2004 | Kondo |

(Continued)

FOREIGN PATENT DOCUMENTS

| CN | 1591060 | 3/2005 |
| DE | 3833315 | 4/1990 |

(Continued)

OTHER PUBLICATIONS

International Search Report in PCT/GB2007/001967 dated Sep. 17, 2007.

*Primary Examiner* — Mathieu D. Vargot
(74) *Attorney, Agent, or Firm* — Nixon & Vanderhye P.C.

(57) ABSTRACT

A light guiding device and in particular to a light guiding device that can be used for illumination, backlighting, signage or display purposes is described. The light guiding device comprises a transparent base substrate, upon a first surface of which are mounted light sources, and a guide substrate arranged so as to encapsulate the light sources upon the first surface. In this way the guide substrate provides a means for guiding light produced by the one or more light sources over the first surface. The incorporation of scattering structures along with appropriate choice of the refractive indices of the various layers provides a highly flexible light guiding device that is typically less than 1 mm thick. The described light guiding device provides particular application as a seven segment display.

7 Claims, 5 Drawing Sheets

U.S. PATENT DOCUMENTS

| | | |
|---|---|---|
| 2005/0053330 A1 | 3/2005 | Arakida et al. |
| 2005/0111241 A1 | 5/2005 | Parker |
| 2008/0296792 A1 | 12/2008 | Gourlay |

FOREIGN PATENT DOCUMENTS

| | | |
|---|---|---|
| DE | 202004010750 | 9/2004 |
| GB | 2159654 | 12/1985 |
| JP | 5127158 | 5/1993 |
| JP | 9237514 | 9/1997 |
| JP | 10171387 | 6/1998 |
| JP | 2004241282 | 8/2004 |
| WO | 00/31465 | 6/2000 |
| WO | 2005/101070 | 10/2005 |
| WO | 2005/107363 | 11/2005 |

* cited by examiner

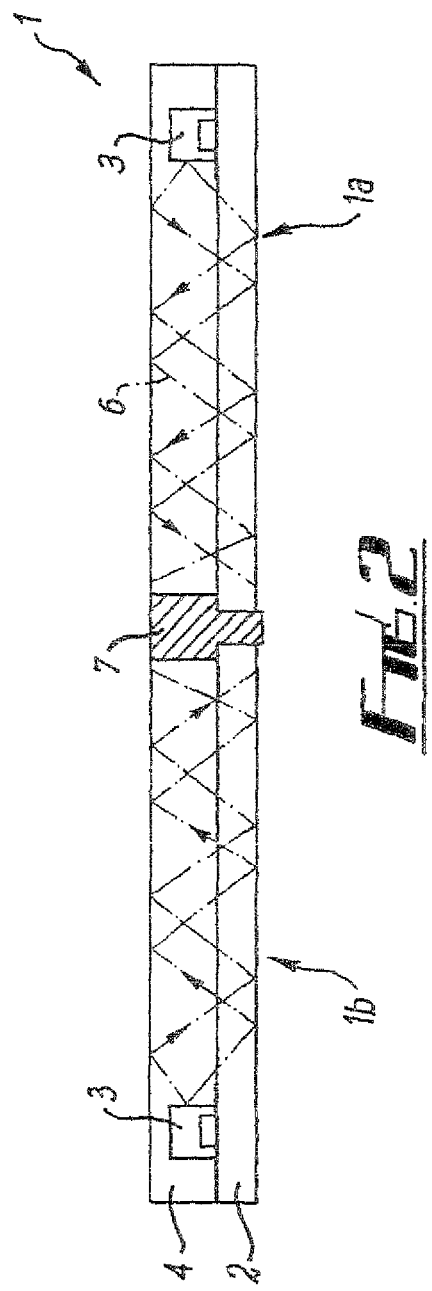
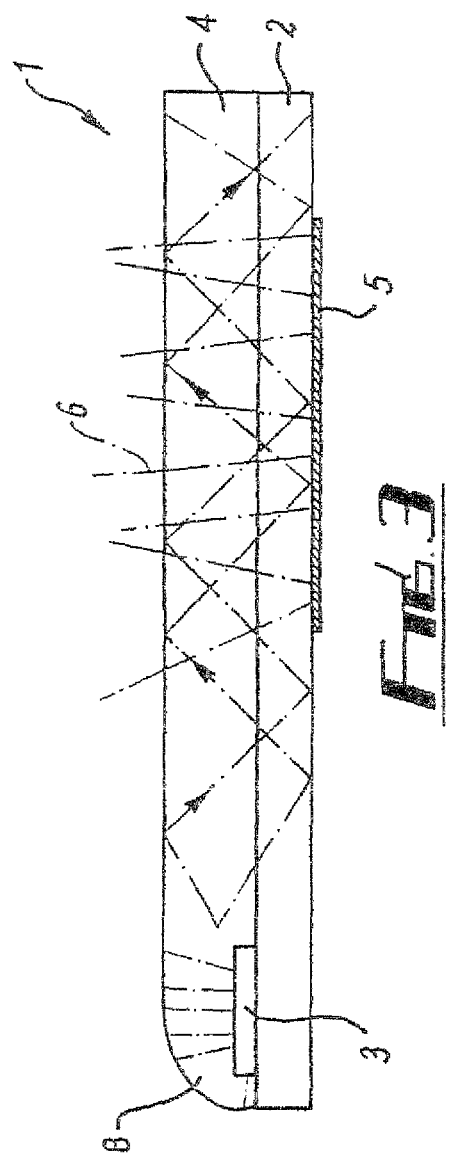

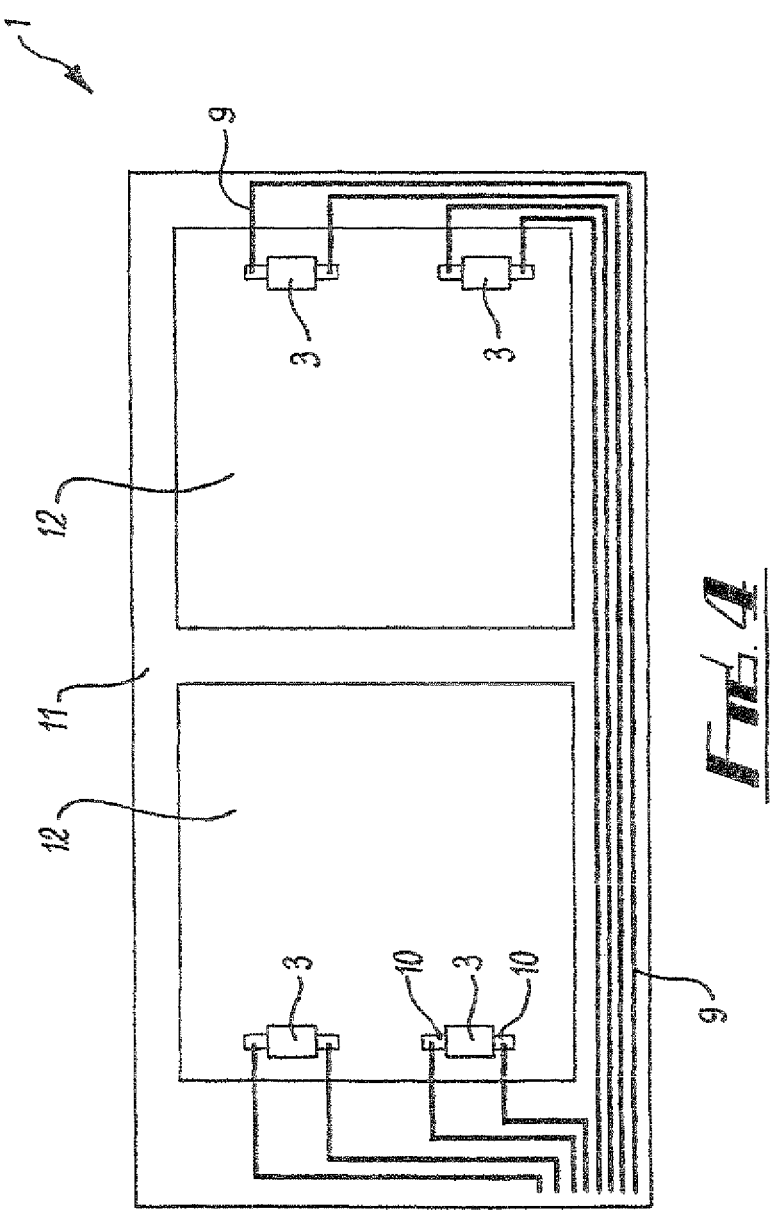

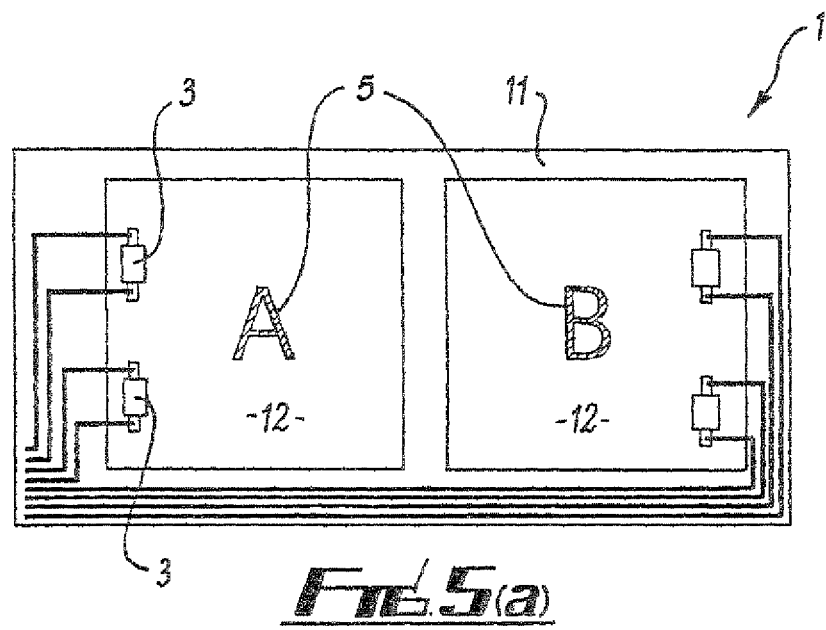
_FIG.5(a)_
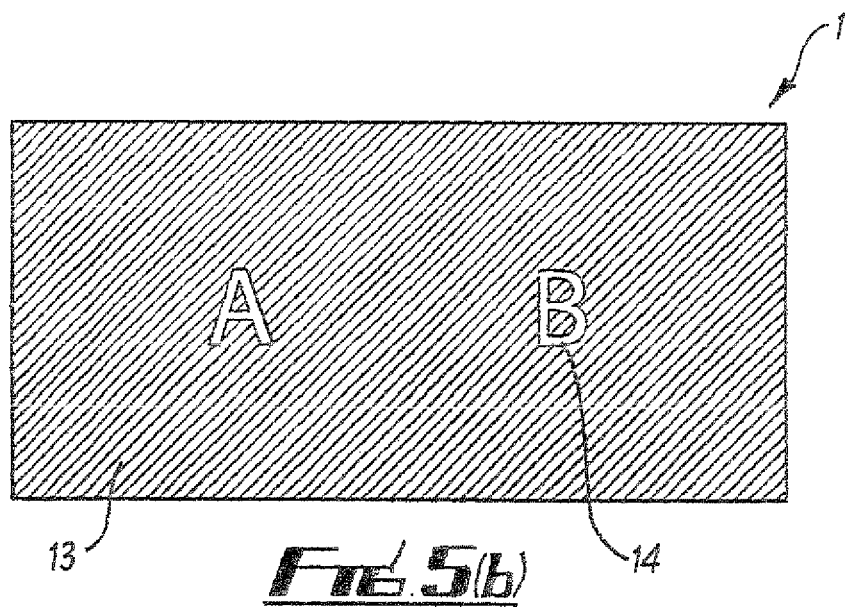
_FIG.5(b)_
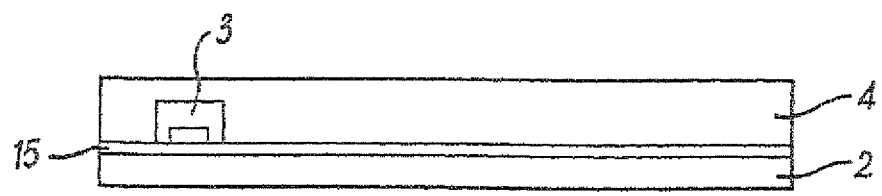
_FIG.6_

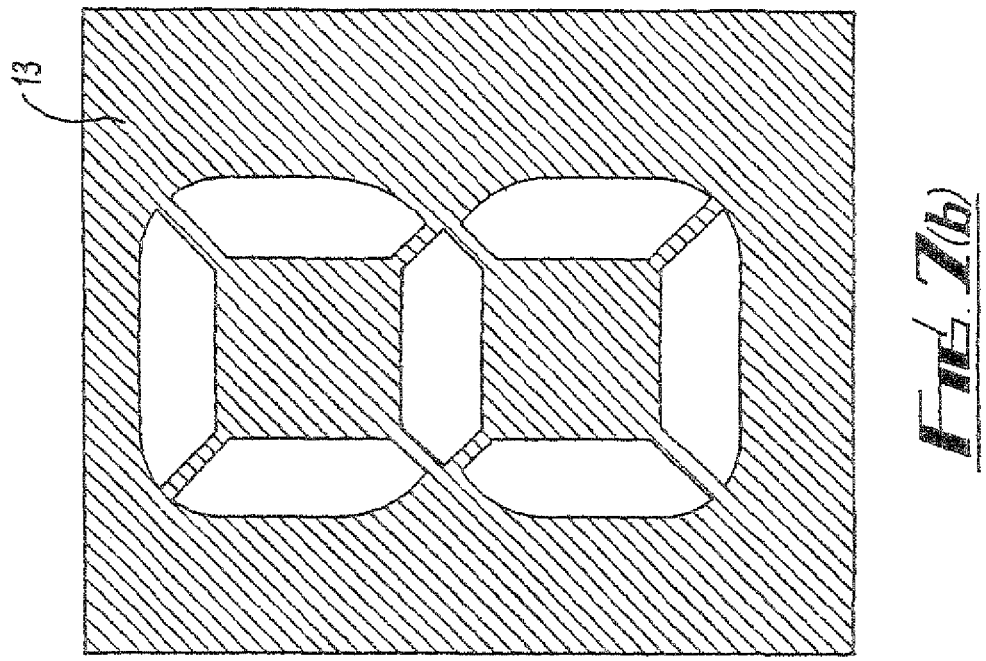
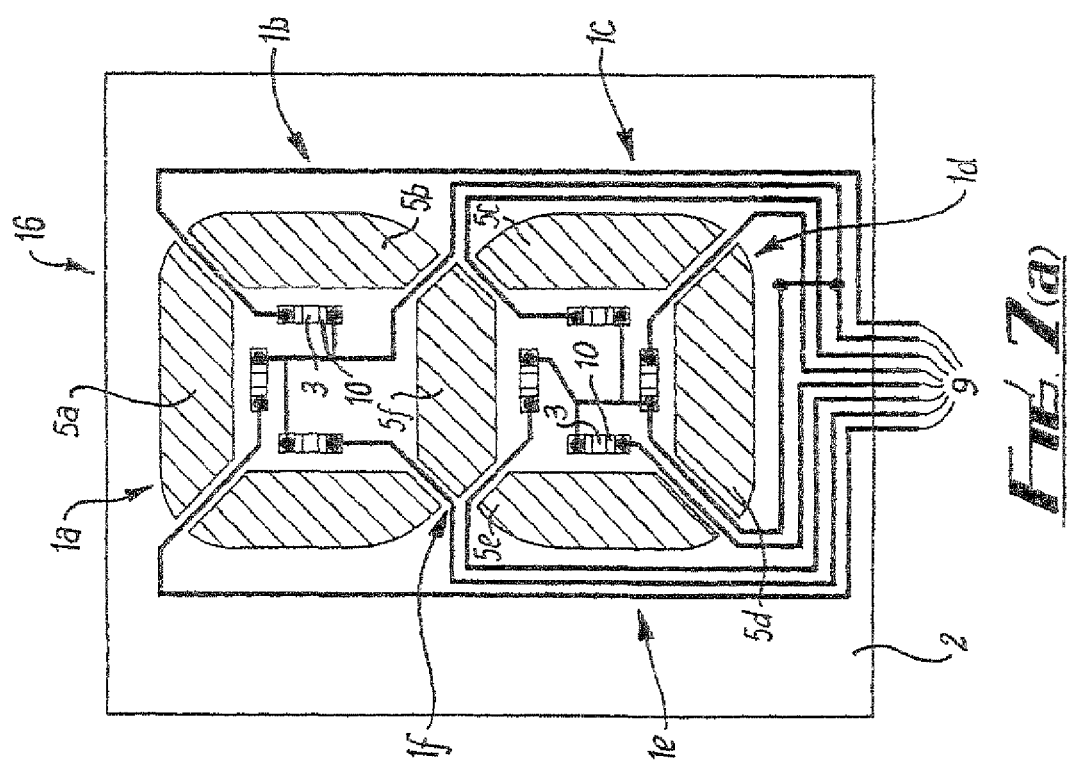

METHOD OF PRODUCING A COMPOSITE LIGHT GUIDING DEVICE

This application is a divisional of U.S. application Ser. No. 12/096,495, filed Jun. 6, 2008, now U.S. Pat. No. 7,954,990, which is the U.S. national phase of International Application No. PCT/GB2007/001967, filed May 25, 2007, which designated the U.S. and claims priority to Great Britain Application No. 0610441.8, filed May 26, 2006, and Great Britain Application No. 0616755.5, filed Aug. 24, 2006, the entire contents of which are hereby incorporated by reference.

The present invention relates to a light guiding device and in particular to a light guiding device that can be used for illumination, backlighting, signage or display purposes.

A number of light guiding devices are known to those skilled in the art. These devices are employed for a range of functions including illumination, backlighting, signage and display purposes. Typically, the devices are constructed from an injection moulded or machined transparent plastic component, where a light source, such as a fluorescent lamp or a plurality of LEDs, is integrated by means of mechanical attachment at the edge of the transparent plastic component. Examples of such devices are provided by the authors within PCT Publication No. 2005/101070.

Common to all of these devices is the fact that light from the light source is guided through a transparent guide, typically made of plastic, by total internal reflection. For backlighting applications, light is emitted in a substantially perpendicular direction to that of the direction of propagation of the light within the transparent guide. This is achieved through the light being directed so as to interact with scattering structures or films located within, or on the surface of, the transparent guide.

It will be appreciated by those skilled in the art that the integration of fluorescent lamps or LEDs to the edge of the transparent light guide is not a straightforward process and thus significantly increases the complexity of the production process for these devices. Achieving a good coupling is essential to the optical performance of the device. In addition, edge coupling of the light sources renders these components susceptible to mechanical damage during both the production process and the normal use of the device.

It is an object of an aspect of the present invention to provide a light guiding device that obviates or at least mitigate one or more of the aforesaid disadvantages.

SUMMARY OF INVENTION

According to a first aspect of the present invention there is provided a light guiding device comprising a transparent base substrate, upon a first surface of which are mounted one or more light sources, and a guide substrate arranged so as to encapsulate the one or more light sources upon the first surface, wherein the guide substrate provides a means for guiding light produced by the one or more light sources over the first surface.

The arrangement of the guide substrate provides a light guiding device that exhibits enhanced mechanical protection for the light sources. Furthermore, since there is no air gap between the output of the light sources and the guide substrate the guide substrate provides a device that is simple to produce and which exhibits enhanced optical coupling of the light within the device. Employing a transparent substrate also provides for increased flexibility for the device i.e. the choice of output surface, creation of independent light controlled areas.

Most preferably the light guiding device further comprises one or more scattering structures arranged so as to redirect light away from the first surface.

Preferably the one or more scattering structures comprises a reflecting layer located on a second surface of the transparent base substrate, the second surface being opposite to the first surface. In such an arrangement the light exits the device via the guide substrate.

Alternatively, the one or more scattering structures comprises a reflecting layer located on the guide substrate and arranged to redirect light towards a second surface of the transparent base substrate, the second surface being opposite to the first surface. In such an arrangement the light exits the device via the transparent base substrate.

Optionally the light guiding device further comprises one or more reflectors arranged so as to divide the light guiding device into two or more independent light guiding structures.

Optionally the light guiding device further comprises one or more blocking regions arranged so as to divide the light guiding device into two or more independent light guiding structures.

Preferably the one or more blocking regions comprise an opaque sheet located on the first surface. Most preferably the opaque sheet comprises one or more apertures that define one or more interaction regions of the device. This arrangement allows for a compact device to be produced within which each separate interaction region can be employed to provide independent illumination, backlighting, signage or display functions.

Optionally the one or more light sources comprise a non-directional source of light. In such embodiments the light guiding device further comprises a reflecting structure located on the guide substrate so as to redirect the light produced by the one or more non-directional sources of light over the first surface. Preferably the reflecting structure comprises a refractive or diffractive optical element so as to maximise the amount of light redirected over the first surface.

Optionally the light guiding device further comprises an opaque layer arranged so that the guide substrate is located between the opaque layer and the transparent base substrate. Most preferably the opaque layer comprises one or more transparent regions located so as to coincide with the one or more scattering structures.

Optionally the light guiding device further comprises a transparent layer arranged so that the transparent layer is located between the guide substrate and the transparent base substrate.

Preferably the refractive index of the transparent base substrate is greater than or equal to the refractive index of the guide substrate. With the refractive index of the transparent base substrate selected to be equal to or higher than that of the guide substrate, the generated light is guided within both the transparent base substrate and the guide substrate due to the effects of total internal reflection.

Alternatively, the refractive index of the transparent base substrate is less than the refractive index of the guide substrate.

Preferably the refractive index of the guide substrate is greater than the refractive index of the transparent layer.

The arrangement of the above two embodiments results in the confinement of the light-guiding within the device to only the guide substrate.

Optionally the light guide device comprises seven light sources arranged on the transparent base substrate so as to form a seven segment display.

According to a second aspect of the present invention there is provided a method of producing a light guide device the method comprising the steps of:

1) Mounting one or more light sources onto a first surface of a transparent base substrate; and 2) Adding a guide layer to the first surface so as to encapsulate the one or more light sources upon the first surface so as to provide a means for guiding light produced by the one or more light sources over the first surface.

Most preferably the step of adding the guide layer to the first surface comprises the steps of:

1) Applying a liquid polymer on the first surface; and

2) Curing the liquid polymer on the first surface.

Preferably the step of applying the liquid polymer on the first surface comprising printing, stencilling or dispensing the liquid polymer.

Optionally the method further comprises the step of applying a scattering structure on the light guide device arranged so as to redirect light away from the first surface. Preferably the application of the scattering structure comprises the step of printing a patterned, reflecting ink layer.

Optionally the method further comprises the step of applying an opaque layer arranged so that the guide layer is located between the opaque layer and the transparent base substrate. Preferably the application of the opaque layer comprises the step of printing an opaque ink.

BRIEF DESCRIPTION OF DRAWINGS

Aspects and advantages of the present invention will become apparent upon reading the following detailed description and upon reference to the following drawings in which:

FIG. 2 presents a side elevation of an alternative embodiment of the composite light device structure of FIG. 1 which incorporates a reflector or blocking region;

FIG. 3 presents a side elevation of a further alternative embodiment of the composite light guide device of FIG. 1 which incorporates non directional light source;

FIG. 4 presents a plan view of a further alternative embodiment of the composite light guide structure of FIG. 1;

FIG. 5 (a) presents a plan view the composite light guide structure of FIG. 4 that now incorporates light scattering means located on the underside of the device; and (b) presents a plan view the composite light guide structure of FIG. 4 that now incorporates a graphic layer located on the top surface of the device;

FIG. 6 presents a side elevation of a further alternative embodiment of the composite light guide device of FIG. 1 which incorporates an additional thin transparent layer; and FIG. 7 (a) presents a plan view of a seven segment composite light guide device; and (b) presents a plan view the seven segment composite light guide device that now incorporates a graphic layer located on the top surface of the device.

DETAILED DESCRIPTION

Figure 1:
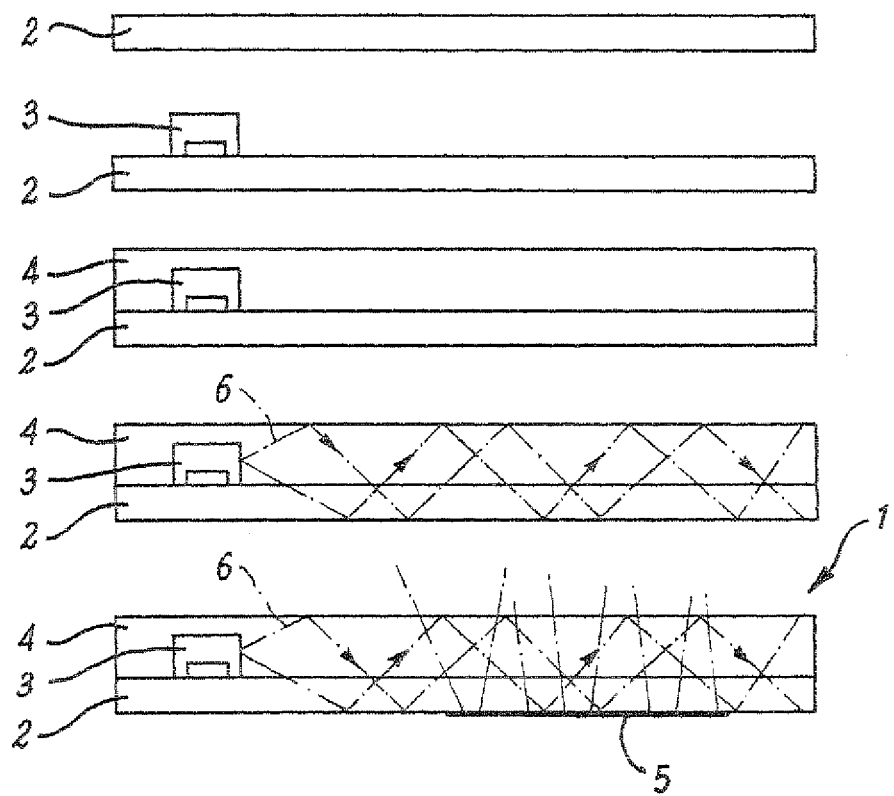
FIG. 1 presents a side elevation of various components of a composite light guide device in accordance with an aspect of the present invention.

In order to assist understanding of various aspects of the present invention, FIGS. 1 to 6 present a number alternative embodiments of a composite light guiding device 1. The terms "transparent" and "opaque" employed throughout the following description relate to the optical properties of particular components of the device relative to the wavelength of the light generated by the incorporated light sources.

Referring initially to FIG. 1, a side elevation of the composite light guiding device 1 at various stages of production is presented. The composite light guiding device 1 comprises a transparent base substrate 2 made from a transparent polymer sheet, such as polyester or polycarbonate and having a refractive index $n_2$ between 1.50 and 1.58. On top of the transparent base substrate 2 is bonded a light source 3 in the form of an LED. Covering the LED 3 and the remaining area of the top surface of transparent base substrate 2 is a transparent guide substrate 4, also formed from a plastic polymer, and having a refractive index $n_4$ between 1.46 and 1.56. Located on the lower surface of the transparent base substrate 2 is a scattering structure 5 in the form a patterned, reflecting ink layer.

The refractive indices of the transparent base substrate 2 and the transparent guide substrate 4 are selected such that they satisfy the inequality $n_2 > n_4$. As a result, and as can be seen from FIG. 1, light 6 generated by the LED light source 3 is initially coupled into the transparent guide substrate 4 so as to propagate in a direction substantially parallel to a plane defined by the transparent base substrate 2. With the refractive index of the transparent base substrate 2 selected to be equal or higher than that of the transparent guide substrate 4, the generated light 6 is guided within both the transparent base substrate 2 and the transparent guide substrate 4 due to the effects of total internal reflection. Therefore, the transparent base substrate 2 and the transparent guide substrate 4 form a composite structure that acts as the guiding media for the light 6 generated by the encapsulated LED light source 3.

When the light 6 has propagated as far as the scattering structure 5 it interacts with this structure so as to be redirected and so exit the device via the top surface of the transparent guide substrate 4, so providing a backlighting function. It will be readily apparent to those skilled in the art that the scattering structure 5 may alternatively be located on the top surface of the transparent guide substrate 4. In this embodiment the redirected light will exit the device via the lower surface of the transparent base substrate 2.

FIG. 2 presents a side elevation of an alternative embodiment of the composite light guide structure 1. In this embodiment the composite structure is divided into two independent light guiding structures 1a and 1b, optically isolated by a light reflector or blocking region 7. Each light guiding structure, 1a and 1b, comprises a dedicated encapsulated LED light source 3 which operates in a similar manner to that described above. Although, no scattering structures 5 are presented in FIG. 2 it will be readily apparent that one or more scattering structures 5 may be incorporated within one, or both, of the light guiding structures 1a and 1b.

For the embodiments presented in FIGS. 1 and 2 the transparent base substrate 2 has a thickness in the range 50 μm to 500 μm. Since the LED light source 3 is a side emitting LED it has a typical height of around 0.6 mm. In order to encapsulate the LED light source 3 the transparent guide substrate 4 is required to have a thickness greater than the height of the LED, in the presently described embodiments the thickness is chosen to be 0.65 mm. Thus it can be seen that the overall thickness of the light guide structure 1 can be less than 1 mm.

A further embodiment of the composite light guiding device 1 is presented in FIG. 3. In this embodiment the light source 3 comprises an LED or laser diode chip, which emits light in all directions. Such chips are typically 250 μm square and have a thickness of the order of 30 μm. In order to achieve the desired coupling of the generated light 6 within the transparent guide substrate 4 such that it propagates in a direction substantially parallel to the plane defined by transparent base substrate 2, a reflecting structure 8 is applied to the top surface of the transparent guide substrate 4 adjacent to the light source 3. The reflecting structure 8 is curve shaped so as to maximise the amount of light directed along the transparent guide substrate 4. By incorporating either a refractive or diffractive optical element within the reflecting structure 8 the desired coupling is further enhanced.

For the embodiments presented in FIG. 3 the transparent base substrate 2 again has a thickness in the range 50 µm to 500 µm. In order to encapsulate the LED light source 3 the transparent guide substrate 4 is required to have a thickness of the order of the square dimensions of the chip i.e. around 250 µm. Thus it can be seen that the overall thickness of the light guide structure 1 can be less than 500 µm.

FIGS. 4 and 5 present plan views of further alternative embodiments of the composite light guide structure 1. In the presently described embodiments conducting electrical tracks 9 are patterned onto the transparent base substrate 2, so forming electrical bonding pads 10 for the light sources 3 and electrical connections for external electrical driving equipment. The electrical tracks are patterned by etching methods, for example copper or gold, or by additive screen printing methods, for example silver loaded adhesive.

The LED light sources 3 are electrically and mechanically attached to the electrical bonding pads 10 by soldering or conducting adhesive methods. A light reflecting or blocking layer 11 is then added onto the substrate. In the presently described example, this layer comprises a coloured polymer sheet, from which two interaction areas 12 have been cut, and which is then laminated onto the transparent base substrate 2. The interaction areas 12 within the polymer sheet thus define cavities which become filled during the application of the transparent guide substrate 4. Typically, the transparent guide substrate 4 is applied by a dispensing, stencilling, or printing method, and thereafter fixed by thermal or UV curing techniques, as is known by those skilled in the art.

By locating a reflector or blocking layer 7 within the transparent base substrate 2 independent light guiding structure 1a and 1b are again produced, in a similar manner to that described above in relation to FIG. 2.

Two different coloured LED light sources 3 are employed in each independent light guiding structure 1a and 1b. Complex light scattering structures 5 in the form of an "A" and a "B", are printed on the underside of the transparent base substrate 2 so as to provide for scattering of the light produced by the coloured light sources. In addition, a printed graphic layer 13 is added to the top surface of the transparent guide substrate 4. The printed graphic layer 13 is substantially opaque except for two transparent regions 14 which mirror the light scattering structures 5 i.e. in the present example these take the form of an "A" and a "B". Thus, the printed graphic layer 13 acts to substantially block the light 6 exiting from the composite light device 1 except from via the two transparent regions 14. In this simple case, the letter "A" can be illuminated or the colour changed, independently of the letter "B".

The composite light guide structure 1 of FIGS. 4 and 5 exhibits an overall thickness of less than 1 mm.

FIG. 6 presents a side elevation of a yet further alternative embodiment of the composite light guide device 1. In this embodiment, a thin transparent layer has been added between the transparent base substrate 2 and the transparent guide substrate 4. The thin transparent layer comprises a plastic polymer that exhibits a refractive index of $n_{15}$, between 1.46 and 1.56, and typically has a thickness of around 50 µm It will be readily apparent that the composite light guide structure 1 of FIG. 6 thus can still exhibits an overall thickness of less than 1 mm.

In practice, the particular value of $n_{15}$ is selected so as to satisfy the inequality $n_4 > n_{15}$. In this way the addition of the low refractive index layer 15 acts to confine the light-guiding within the device 1 to only the transparent guide substrate 4 due to total internal reflection resulting from the difference between the refractive index of the transparent guide substrate 4 and the thin transparent layer 15.

It will be readily apparent to those skilled in the art that the confinement of the light-guiding within the device 1 to only the transparent guide substrate 4 can alternatively be achieved if the refractive indices of the transparent base substrate 2 and the transparent guide substrate 4 are such that they satisfy the inequality $n_2 < n_4$.

In this embodiment, and that described with reference to FIG. 6 the scattering structure, which may again be in the form a patterned, reflecting ink layer is either located on the upper surface of the transparent base substrate 2 or on the upper surface of the transparent guide substrate 4 depending on what surface of the device 1 the light 6 is required to exit.

The employment of the transparent guide substrate 4 so as to encapsulate the light sources 3 and the electrical tracks 9 provides the composite light guiding device 1 with a number of advantages over those devices known in the art. In the first instance the transparent guide substrate 4 provides enhanced mechanical protection for the light sources and the associated electrical connections.

As a result of the fact that there is no air gap between the output of the light sources and the light guiding media the transparent guide substrate 4 provides a simpler, and in fact enhanced means of optically coupling the light within the device.

Employment of the transparent base substrate 2 also provides for an increased flexibility in the choice of the output surface for the device. For example, the output surface for the light source may be either the top surface of the light guide substrate 4, the second surface of the transparent base substrate 2, or a combination of both. The precise nature of the output of the device 1 is dictated by the relative refractive indices between the transparent base substrate 2 and the guide substrate 4 and the choice of the arrangement of the scattering structures 5.

In addition, the employment of a transparent base substrate 2 also allows for enhanced containment and guiding of the light generated by the one or more light sources 3 through the device 1, when compared with those devices described in the prior art. As a result there is a more efficient transfer of light to the regions where the scattering structures 5 of the device are located.

Also, the design of the present device makes it is much easier to create sequenced (or independently) light controlled areas with low light leakage between them. The light guiding can be easily sequenced and different areas supplied by light from different light sources. Low cost system level manufacture is also possible.

A further advantage resides in the fact that it is possible to select a high quality optical film for the transparent base substrate 2 in order to provide an enhanced optical performance for the overall composite device 1, compared with for example, all injection moulded non-composite devices.

The described the composite light guiding devices 1 are thinner, typically less than 1 mm thickness, than those devices known in the art. An added advantage of such thin devices is that it enables then to exhibit enhanced mechanical flexibility.

It is envisaged that the described light guiding devices will have a wide range of applications in the field of human/machine interface. For example these devices may readily be employed in products ranging from industrial control panels, automotive/avionic displays, personal electronic equipment and point of sale items.

When produced without a scattering structure, the composite light-guiding device effectively transfers light from the light source to the opposite end of the guiding composite. This device can then be used as a more mechanically robust and efficient, flexible light piping device for remote delivery of light, where the light source and electrical connections are distant from where the light is to be deployed. Applications, such as high performance illumination in industrial or medical, machine vision can be addressed, where conventional solutions, such as moulded light-pipes or fibre optics, with separate light sources are normally deployed.

Seven Segment Composite Light Guide Device

A number of segmented LED displays are known to those skilled in the art. These displays are employed for numeric and character indication on electronic and electrical machines. They are typically produced by mounted a number of independently controlled top emitting LEDs onto a circuit board and then forming a light blocking structure and diffuser layer, above the LEDs to the shape of the segmented pattern required. The most common form of segmented LED displays is the seven segment display, where seven back illuminated shapes form the pattern of the number eight. With such an arrangement the controlled switching off or on different of the different segments provides for the numbers zero through to nine to be produced. Within the prior art displays the height of the light blocking structure must be high enough to provide for uniform illumination of each segment from one, or a number of, LEDs on a circuit board to the diffuser.

A particular application of the composite light guiding device 1 shall now be described in detail with reference to FIG. 7. In particular, FIG. 7 presents a plan view of a seven segment composite light guide device 16 in the absence, FIG. 7(a), and presence, FIG. 7(b) of a graphic layer 13 located on the top surface of the device.

Each segment of the seven segment composite light guide device 16 can be thought of as an individual composite light guiding device 1a-f mounted on a common transparent base substrate 2. Thus, each segment 1a-f comprises electrical tracks 9 pattered onto the base substrate 2 so as to form electrical bonding pads 10 for the associated light source 3. In the presently described embodiment the light sources comprise side emitting LEDs arranged so that the emitted light propagates across the surface of the base substrate 2. The segments 1a-f and the remaining exposed area of the base substrate is covered by the transparent guide substrate 4.

The redirection of the emitted light out of the plane of propagation is enhanced by the incorporation of the scattering structures 5a-f. In this embodiment the scattering structures 5a-f may again comprise a patterned, reflective ink layer located on the lower surface of the base substrate 2. Incorporation of the graphic layer 13, in the form of the number eight, helps to further increase the definition of the display during operation.

Operation of the seven segment composite light guide device 16 is similar to that of those devices known in the art. Control of the electrical supply to each of the segments provides the means for the device to display the numbers zero through to nine, as and when required.

The described seven segment composite light guide device provides an improved means of generating a segmented display, where a light-guide transfers light from the side of each segment to the illumination region. In particular, the described configuration results in a display device that is much thinner, and so exhibits increased mechanical flexibility, than those displays produced employing conventional techniques.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention, as defined by the appended claims.

What is claimed is:

1. A method of producing a light guide device the method comprising the steps of:
    mounting one or more light sources onto a first surface of a transparent base substrate having a first refractive index; and
    adding a guide layer, having a second refractive index that is less than or equal to the first refractive index, to the first surface so as to encapsulate the one or more light sources upon the first surface and provide a means for guiding light produced by the one or more light sources such that the light can be guided through the guide layer and over the first surface and such that the light can propagate from the guide layer into the transparent base substrate.

2. A method of producing a light guide device as claimed in claim 1 wherein the step of adding the guide layer to the first surface comprises the steps of:
    applying a liquid polymer on the first surface; and
    curing the liquid polymer on the first surface.

3. A method of producing a light guide device as claimed in claim 2 wherein the step of applying the liquid polymer on the first surface comprising printing, stencilling or dispensing the liquid polymer.

4. A method of producing a light guide device as claimed in claim 1 wherein the method further comprises the step of applying a scattering structure on the light guide device arranged so as to redirect light away from the first surface.

5. A method of producing a light guide device as claimed in claim 4 wherein the application of the scattering structure comprises the step of printing a patterned, reflecting ink layer.

6. A method of producing a light guide device as claimed in claim 1 wherein the method further comprises the step of applying an opaque layer arranged so that the guide layer is located between the opaque layer and the transparent base substrate.

7. A method of producing a light guide device as claimed in claim 6 wherein the application of the opaque layer comprises the step of printing an opaque ink.

* * * * *